US012812091B2

(12) United States Patent
Zhao et al.

(10) Patent No.: US 12,812,091 B2
(45) **Date of Patent: *Nov. 24, 2026**

(54) PREDICTION OF INTRABC FLIP TYPE

(71) Applicant: TENCENT AMERICA LLC, Palo Alto, CA (US)

(72) Inventors: Xin Zhao, Santa Clara, CA (US); Xiaozhong Xu, State College, PA (US); Lien-Fei Chen, Hsinchu (TW); Guichun Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/053,969

(22) Filed: Feb. 14, 2025

(65) Prior Publication Data

US 2025/0193374 A1 Jun. 12, 2025

Related U.S. Application Data

(63) Continuation of application No. 17/982,126, filed on Nov. 7, 2022, now Pat. No. 12,231,622.

(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/154* (2014.11); *H04N 19/176* (2014.11); *H04N 19/70* (2014.11)

(58) Field of Classification Search
CPC .... H04N 19/105; H04N 19/11; H04N 19/132; H04N 19/154; H04N 19/176; H04N 19/593; H04N 19/70

(Continued)

(56) References Cited

U.S. PATENT DOCUMENTS

2005/0117646 A1 6/2005 Joch et al.
2015/0264396 A1 9/2015 Zhang et al.
(Continued)

FOREIGN PATENT DOCUMENTS

JP 2011-114572 A 9/2011

OTHER PUBLICATIONS

International Search Report dated Mar. 8, 2023 in Application No. PCT/US2022/049241.

(Continued)

*Primary Examiner* — William C Vaughn, Jr.
*Assistant Examiner* — Astewaye Gettu Zewede
(74) *Attorney, Agent, or Firm* — Sughrue Mion, PLLC

(57) ABSTRACT

A method performed by a video decoder includes receiving a coded video bitstream including a current picture that includes at least one block. The method includes determining that the at least one block is to be predicted in a reconstruction-reordered intra block copy (RR-IBC) mode. The method includes obtaining a syntax element from the at least one block, the syntax element indicating a flip mode. The method includes determining whether reconstruction flip is applied to the at least one block. The method includes, in response to determining the reconstruction flip is applied to the at least one block, predicting a flip pattern for the at least one block based on neighboring reconstruction samples of the at least block and a corresponding reference block of the at least one block. The method further includes decoding the at least one block based on the flip mode and the predicted flip pattern.

17 Claims, 20 Drawing Sheets

Related U.S. Application Data

(60) Provisional application No. 63/388,527, filed on Jul. 12, 2022.

(51) Int. Cl.
*H04N 19/154* (2014.01)
*H04N 19/176* (2014.01)
*H04N 19/70* (2014.01)

(58) Field of Classification Search
USPC .......................................................... 375/240
See application file for complete search history.

(56) References Cited

U.S. PATENT DOCUMENTS

| | | | | |
|---|---|---|---|---|
| 2017/0070748 | A1* | 3/2017 | Li | H04N 19/115 |
| 2017/0195677 | A1 | 7/2017 | Ye et al. | |
| 2019/0297339 | A1 | 9/2019 | Hannuksela et al. | |
| 2020/0045336 | A1* | 2/2020 | Xiu | H04N 19/597 |
| 2022/0172404 | A1* | 6/2022 | Kim | G06T 3/40 |
| 2022/0217399 | A1 | 7/2022 | Liang et al. | |
| 2022/0321885 | A1* | 10/2022 | Lim | H04N 19/126 |

OTHER PUBLICATIONS

Written Opinion of the International Searching Authority dated Mar. 8, 2023 in Application No. PCT/US2022/049241.

Zhang et al. "Combining intra block copy and neighboring samples using convolutional neural network for image coding" IEEE Visual Communications and Image Processing (VCIP), Dec. 12, 2018, (4 total pages).

European Search Report dated Jun. 17, 2026 in EP Application No. 22951338.7.

Communication issued Sep. 18, 2026 by the Japan Patent Office in Japanese Patent Application No. 2024-518164.

* cited by examiner (a) horizontal split (b) vertical split

PREDICTION OF INTRABC FLIP TYPE

CROSS-REFERENCE TO RELATED APPLICATION

This application is a Continuation application of U.S. application Ser. No. 17/982,126 filed on Nov. 7, 2022, which is based on and claims priority to U.S. Provisional Patent Application No. 63/388,527 filed on Jul. 12, 2022, the disclosure of each of which are incorporated by reference herein in its entirety.

TECHNICAL FIELD

The present disclosure is related to prediction and signalling methods for the Intra BC flip type.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC, and the new standard was named Versatile Video Coding (VVC). JVET was renamed as Joint Video Experts Team. In 2020, ITU-T VCEG (Q6/16) and ISO/IEC MPEG (JTC 1/SC 29/WG 11) published the VVC video coding standard (version 1).

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for prediction and signalling for the Intra BC flip type.

According to an exemplary embodiment, a method performed by at least one processor in a video decoder includes receiving a coded video bitstream including a current picture that includes at least one block. The method includes determining that the at least one block is to be predicted in a reconstruction-reordered intra block copy (RR-IBC) mode. The method includes obtaining a syntax element from the at least one block, the syntax element indicating a flip mode. The method includes determining whether reconstruction flip is applied to the at least one block. The method includes, in response to determining the reconstruction flip is applied to the at least one block, predicting a flip pattern for the at least one block based on neighboring reconstruction samples of the at least block and a corresponding reference block of the at least one block. The method further includes decoding the at least one block based on the flip mode and the predicted flip pattern.

According to an exemplary embodiment, a video decoder includes at least one memory configured to store computer program code, and at least one processor configured to access the computer program code and operate as instructed by the computer program code. The computer program code includes receiving code configured to cause the at least one processor to receive a coded video bitstream including a current picture that includes at least one block. The computer program code includes first determining code configured to cause the at least one processor to determine that the at least one block is to be predicted in a reconstruction-reordered intra block copy (RR-IBC) mode. The computer program code includes obtaining code configured to cause the at least one processor to obtain a syntax element from the at least one block, the syntax element indicating a flip mode. The computer program code includes second determining code configured to cause the at least one processor to determine whether reconstruction flip is applied to the at least one block. The computer program code includes predicting code configured to cause the at least one processor to, in response to determining the reconstruction flip is applied to the at least one block, determine a flip pattern for the at least one block based on neighboring reconstruction samples of the at least block and a corresponding reference block of the at least one block. The computer program code further includes decoding code configured to cause the at least one processor to decode the at least one block based on the flip mode and the predicted flip pattern.

According to an exemplary embodiment, a non-transitory computer readable medium having instructions stored therein, which when executed by a processor in a video decoder cause the processor to execute a method including receiving a coded video bitstream including a current picture that includes at least one block. The method includes determining that the at least one block is to be predicted in a reconstruction-reordered intra block copy (RR-IBC) mode. The method includes obtaining a syntax element from the at least one block, the syntax element indicating a flip mode. The method includes determining whether reconstruction flip is applied to the at least one block. The method includes in response to determining the reconstruction flip is applied to the at least one block, predicting a flip pattern for the at least one block based on neighboring reconstruction samples of the at least block and a corresponding reference block of the at least one block. The method further includes decoding the at least one block based on the flip mode and the predicted flip pattern.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
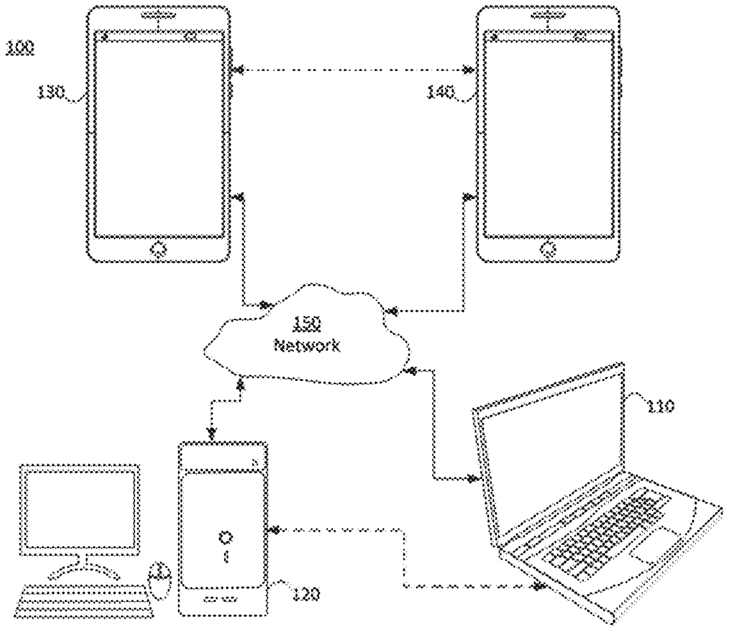
FIG. 1 is a schematic illustration of a block diagram of a communication system, in accordance with various embodiments of the present disclosure.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
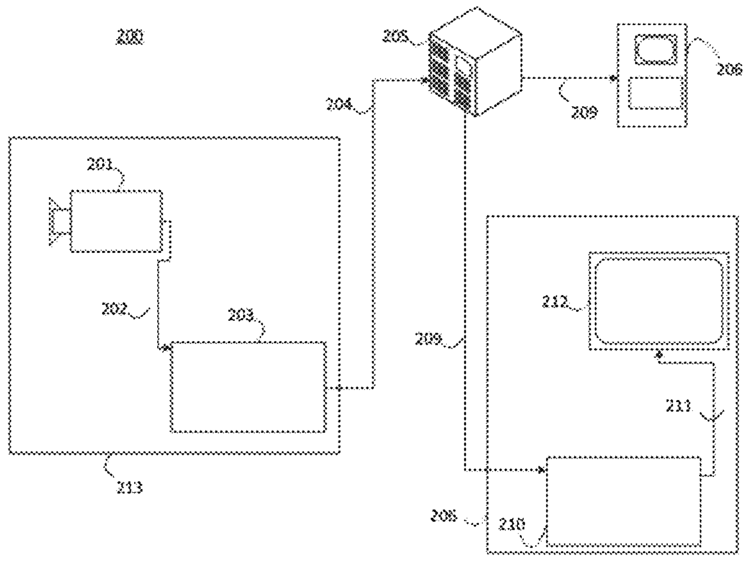
FIG. 2 is a schematic illustration of a block diagram of a communication system, in accordance with various embodiments of the present disclosure.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that may include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and may be processed by the encoder (203) coupled to the video source (201), which may be for example a camera. The encoder (203) may include hardware, software, or a combination thereof to enable or implement aspects of the disclosed subject matter as described in more detail below. The encoded video bitstream (204) may include a lower data volume when compared to the sample stream, and may be stored on a streaming server (205) for future use. One or more streaming clients (206) may access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) may include a video decoder (210) and a display (212). The video decoder (210) may, for example, decode video bitstream (209), which is an incoming copy of the encoded video bitstream (204), and create an outgoing video sample stream (211) that may be rendered on the display (212) or another rendering device (not depicted). In some streaming systems, the video bitstreams (204, 209) may be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
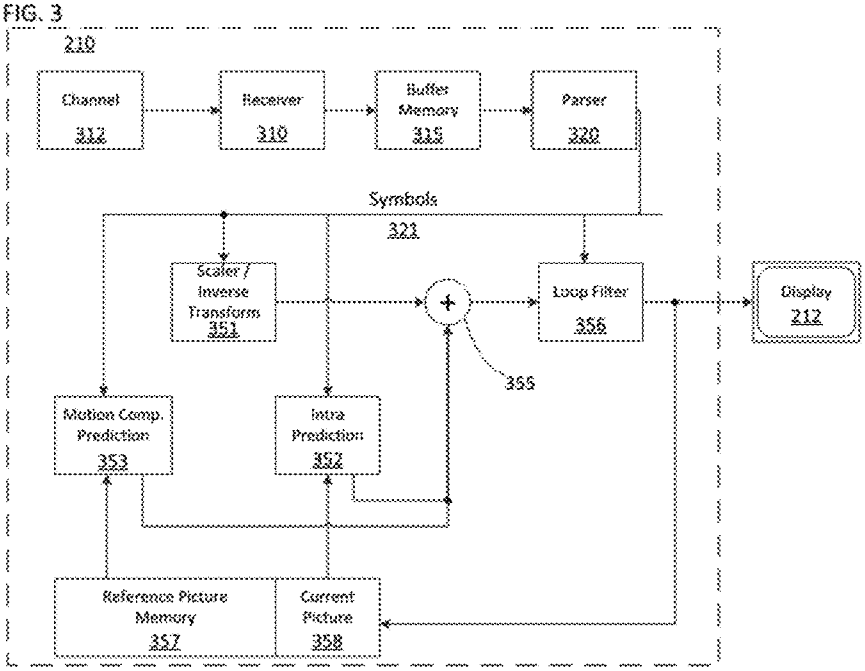
FIG. 3 is a schematic illustration of a block diagram of a decoder, in accordance with various embodiments of the present disclosure.

FIG. 3 illustrates an example functional block diagram of a video decoder (210) that is attached to a display (212) according to an embodiment of the present disclosure. The video decoder (210) may include a channel (312), receiver (310), a buffer (315), which may be for example a buffer memory, an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or may be small. For use on best effort packet networks such as the Internet, the buffer (315) may be required, may be comparatively large, and may be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups may include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321). Reconstruction of the symbols (321) may involve multiple different units depending on the type of the coded video picture or parts thereof (such as: inter and intra picture, inter and intra block), and other factors. Which units are involved, and how they are involved, may be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) may be conceptually subdivided into a number of functional units as described below. In a practical implementation operating under commercial constraints, many of these units interact closely with each other and may, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) may output blocks including sample values that may be input into the aggregator (355).

In some cases, the output samples of the scaler/inverse transform unit (351) may pertain to an intra coded block; that is: a block that is not using predictive information from previously reconstructed pictures, but may use predictive information from previously reconstructed parts of the current picture. Such predictive information may be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) may pertain to an inter coded, and potentially motion compensated block. In such a case, a Motion Compensation Prediction unit (353) may access reference picture memory (357) to fetch samples used for prediction. After motion compensating the fetched samples in accordance with the symbols (321) pertaining to the block, these samples may be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, may be controlled by motion vectors. The motion vectors may be available to the Motion Compensation Prediction unit (353) in the form of symbols (321) that may have, for example, X, Y, and reference picture components. Motion compensation also may include interpolation of sample values as fetched from the reference picture memory (357) when sub-sample exact motion vectors are in use, motion vector prediction mechanisms, and so forth.

The output samples of the aggregator (355) may be subject to various loop filtering techniques in the loop filter unit (356). Video compression technologies may include in-loop filter technologies that are controlled by parameters included in the coded video bitstream and made available to the loop filter unit (356) as symbols (321) from the parser (320), but may also be responsive to meta-information obtained during the decoding of previous (in decoding order) parts of the coded picture or coded video sequence, as well as responsive to previously reconstructed and loop-filtered sample values.

The output of the loop filter unit (356) may be a sample stream that may be output to a render device such as a display (212), as well as stored in the reference picture memory (357) for use in future inter-picture prediction.

Certain coded pictures, once fully reconstructed, may be used as reference pictures for future prediction. Once a coded picture is fully reconstructed and the coded picture has been identified as a reference picture (by, for example, parser (320)), the current reference picture may become part of the reference picture memory (357), and a fresh current picture memory may be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels may, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or SNR enhancement layers, redundant slices, redundant pictures, forward error correction codes, and so on.

Figure 4:
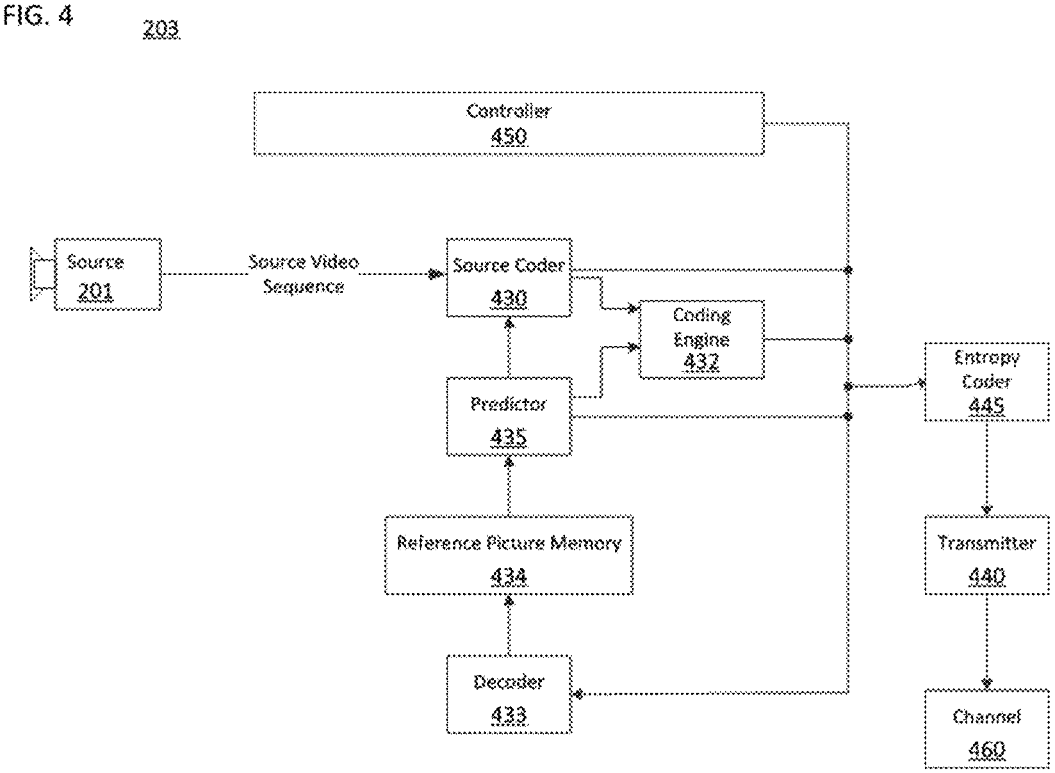
FIG. 4 is a block diagram of an encoder, in accordance with various embodiments of the present disclosure.

FIG. 4 illustrates an example functional block diagram of a video encoder (203) associated with a video source (201) according to an embodiment of the present disclosure. The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203). The video source (201) may provide the source video sequence to be coded by the encoder (203) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (201) may be a camera that captures local image information as a video sequence. Video data may be provided as a plurality of individual pictures that impart motion when viewed in sequence. The pictures themselves may be organized as a spatial array of pixels, wherein each pixel may include one or more sample depending on the sampling structure, color space, etc. in use. A person skilled in the art may readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450).

The controller (450) may also control other functional units as described below and may be functionally coupled to these units. The coupling is not depicted for clarity. Parameters set by the controller (450) may include rate control related parameters (picture skip, quantizer, lambda value of rate-distortion optimization techniques, . . . ), picture size, group of pictures (GOP) layout, maximum motion vector search range, and so forth. A person skilled in the art may readily identify other functions of controller (450) as they may pertain to video encoder (203) optimized for a certain system design.

Some video encoders operate in what a person skilled in the are readily recognizes as a "coding loop". As an over-simplified description, a coding loop may consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) may be the same as of a "remote" decoder (210), which has already been described in detail above in conjunction with FIG. 3. However, as symbols are available and en/decoding of symbols to a coded video sequence by the entropy coder (445) and the parser (320) may be lossless, the entropy decoding parts of decoder (210), including channel (312), receiver (310), buffer (315), and parser (320) may not be fully implemented in the local decoder (433).

An observation that may be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies may be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data. Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown). The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In some embodiments, the IBC coding tool appears in the HEVC SCC extensions as current picture referencing (CPR) and follows the coding path for inter prediction, although the IBC concept only requires the current frame. The main motivation behind the concept was the referencing structure, where the representation of the addressing mechanism to the reference samples may be as two-dimensional spatial vectors. Another benefit of such an architecture is that the integration of IBC requires the least changes to the specification and could ease the implementation burden, assuming manufacturers have already implemented the HEVC version 1. For the reason as mentioned above, CPR in the HEVC SCC extensions is a special inter prediction mode, resulting in the same syntax structure and almost the same decoding processes.

In some embodiments, as IBC (or CPR) is an inter prediction mode, an intra-only predicted slice has to become a predicted slice for allowing the usage of IBC. When IBC is applicable, the coder must extend the reference picture lists by one entry for the pointer to the current picture, i.e., the current picture takes up to one picture-sized buffer of the shared decoded picture buffer (DPB). The IBC mode signaling is implicit, i.e., when the selected reference picture points to the current picture, the coding unit employs IBC. The reference samples within the IBC process are not filtered, which is in contrast to regular inter prediction, and the corresponding reference picture is a long-term reference. To minimize the memory requirement, the coder may immediately release the buffer after reconstructing the current picture [32]. The coder may put a filtered version of the reconstructed picture back into the DPB as a short-term reference when it is a reference picture.

Figure 5:
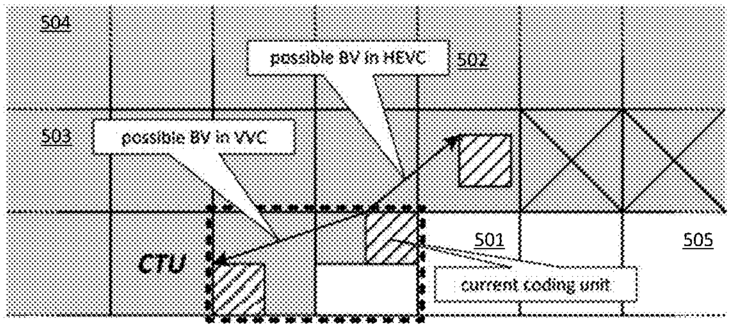
FIG. 5 is a diagram illustrating the IBC concept in HEVC and VVC, in accordance with various embodiments of the present disclosure.

FIG. 5 illustrates the IBC concept in HEVC and VVC, where each square shape denotes a coding tree unit (501). The gray-shaded area (504) denotes the already coded region, whereas the white-shaded area (505) denotes the upcoming coding region. IBC in HEVC allows the gray-shaded area (504) usage except for the two CTUs on the right above the current CTU (501) for allowing Wavefront Parallel Processing (WPP). On the other hand, IBC in VVC only allows the CTU to the left of the current CTU as the reference area, denoted by the dotted frame As shown in FIG. 5, the referencing to a reconstructed area is via two-dimensional so-called block vectors (BV) as for inter prediction, and its prediction and coding reuse the motion vector (MV) prediction and coding of the inter prediction process. However, the luma BVs are in integer resolution rather than ¼-th precision for the regular inter CTU possible BV in HEVC (502) current coding unit possible BV in VVC (503). The illustration summarizes the IBC concept in HEVC and VVC, where each square shape denotes a coding tree unit (CTU) (501). The gray-shaded area (504) denotes the already coded region, whereas the white-shaded area (505) denotes the upcoming coding region. IBC in HEVC allows the gray-shaded area (504) usage except for the two CTUs on the right above the current CTU for allowing Wavefront Parallel Processing (WPP). On the other hand, IBC in VVC only allows the CTU to the left of the current CTU as the reference area, denoted by the dotted frame prediction mode. Consequently, the decoded motion vector differences (MVD) of BVs have to be left-shifted by two before adding to its predictor for the final BV reconstruction.

Special handling was necessary for implementation and performance reasons, resulting in differences to the regular inter prediction mode, and they are as follows. The IBC reference samples are unfiltered, i.e., the reconstructed samples before the in-loop filtering processes, including DBF and Sample Adaptive Offset (SAO), whereas the other inter prediction modes of HEVC employ filtered samples. There is no luma sample interpolation for IBC, and chroma sample interpolation is only necessary when the chroma BV is a non-integer when derived from the luma BV. A special case occurs when the chroma BV is a non-integer, and the reference block is near the boundary of an available region. The surrounding reconstructed samples would be outside of the boundary to perform chroma interpolation. BVs pointing to a single next-to-border line are not possible to avoid such cases.

Figure 6:
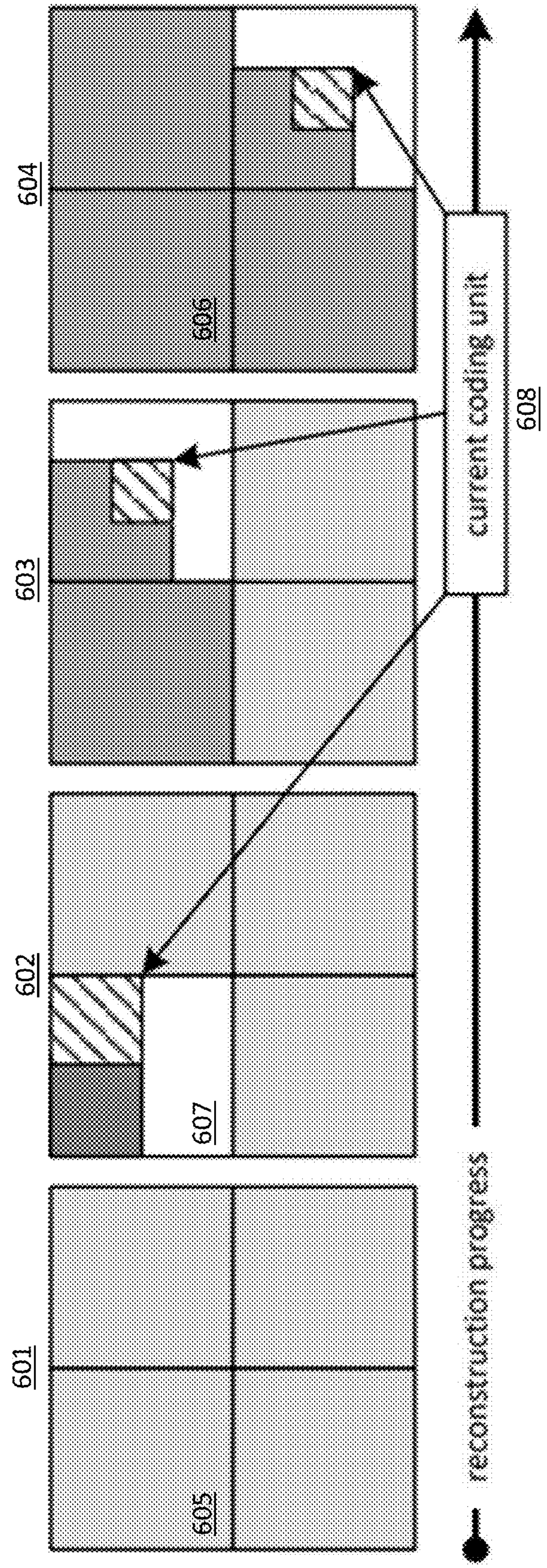
FIG. 6 is a diagram illustrating the reference sample memory (RSM) update process, in accordance with various embodiments of the present disclosure.

FIG. 6 illustrates the reference sample memory (RSM) update process at four intermediate times (601-604) during the reconstruction process, where the light-gray shaded area (605) denotes the reference samples of the left neighboring CTU, the dark-gray shaded area (606) denotes the reference samples of the current CTU, and the white-shaded area (607) the upcoming coding region.

In some embodiments, the effective reference area for IBC in the HEVC SCC extensions is almost the whole already reconstructed area of the current picture, with some exceptions for parallel processing purposes. FIG. 6 illustrates the reference area for IBC in HEVC and the configuration in VVC, where only the coding tree unit to the left of the current CTU (608) served as the reference sample area at the beginning of the current CTU's reconstruction process. A drawback of the concept in HEVC is the requirement for additional memory in the DPB, for which hardware implementations usually employ external memory. Additional access to external memory comes with increased memory bandwidth, making the concept of using the DPB less attractive. VVC uses a fixed memory that may realize on-chip for IBC, significantly decreasing the complexity of implementing IBC in hardware architectures. Another significant modification addresses the signaling concept departed from the integration within the inter prediction process as in the HEVC SCC extensions.

In some embodiments, the IBC architecture in VVC forms a dedicated coding mode, where the IBC mode is the third prediction mode besides the intra and inter prediction modes. The bitstream carries the IBC syntax element indicating the IBC mode for a coding unit when the block size is 64×64 or less. Consequently, the largest CU size that may utilize IBC is 64×64 to realize the continuous memory update mechanism of the reference sample memory (RSM). However, the reference sample addressing mechanism remains the same as in the HEVC SCC extensions by denoting a two-dimensional offset and reusing the inter prediction's vector coding processes. Another special case occurs when the CST is active, where the coder cannot derive chroma BVs from the luma BVs, resulting in the usage of IBC for the luma coding block only.

Figure 7:
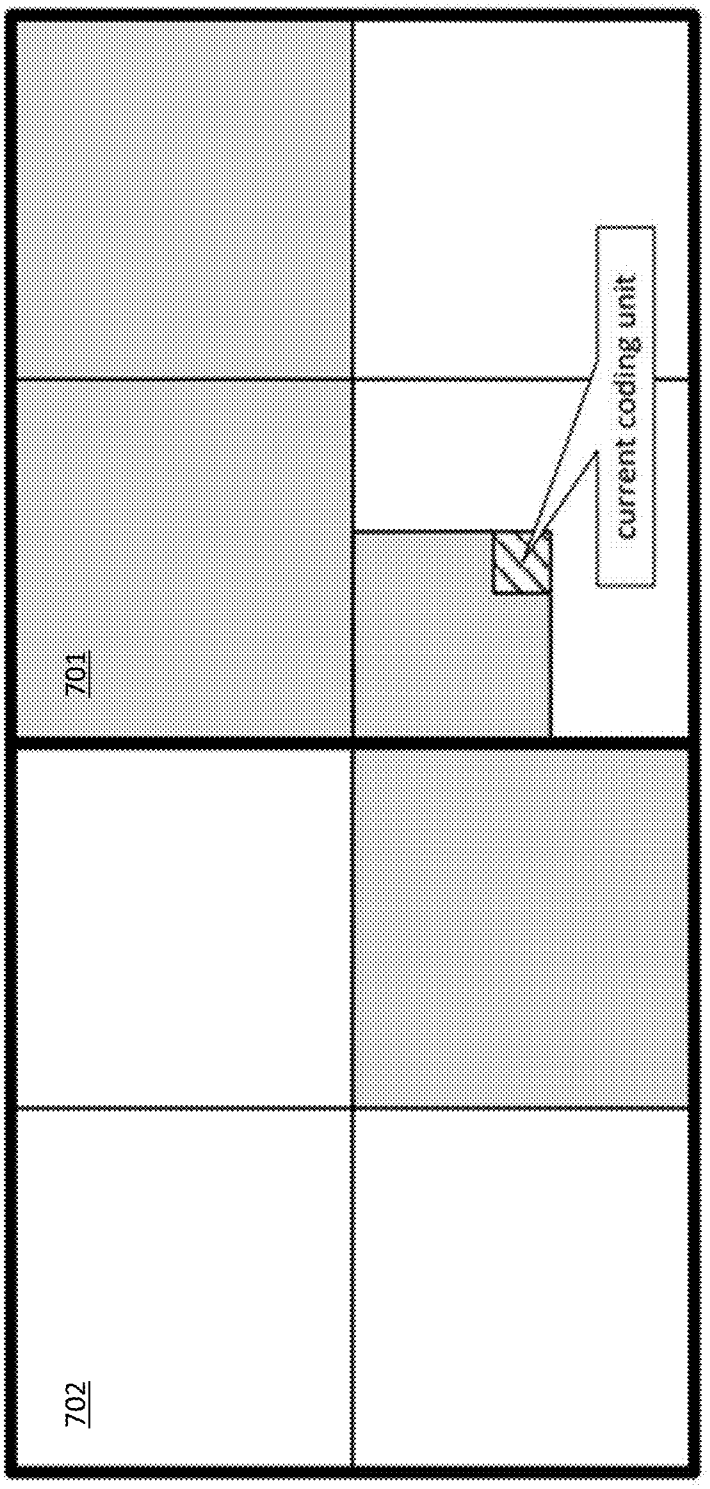
FIG. 7 is a diagram illustrating the left neighboring CTU and the current CTU, in accordance with various embodiments of the present disclosure.

The IBC design in VVC employs a fixed memory size of 128×128 for each color component for storing the reference samples, enabling the possibility for an on-chip placement in hardware implementations. The maximum CTU size in VVC is also 128×128, i.e., the reference sample memory (RSM) may hold samples of a single CTU when the maximum CTU size configuration is equal to 128×128. A special feature of the RSM is the continuous update mechanism replacing the reconstructed samples of the left neighboring CTU with the reconstructed samples of the current CTU. FIG. 6 illustrates a simplified RSM example for the update mechanism at four intermediate times (601-604) during the reconstruction process. The light-gray shaded area (605) denotes the reference samples of the left-neighboring CTU, and the dark-gray shaded area (606) denotes the reference samples of the current CTU (608). At the first intermediate time (601), representing the beginning of the current CTU (608) reconstruction, the RSM consists of reference samples of the left neighboring CTU only. In the other three intermediate times (602-604), the reconstruction process has replaced samples of the left neighboring CTU with the current CTU's variants. There is an implicit division of the RSM into four disjoint 64×64 areas where a reset of an area occurs when the coder processes the first coding unit that would lie in the corresponding area when mapping the RSM to the CTU, easing the hardware implementation efforts. FIG. 7 illustrates the continuous update concept of the RSM spatially, i.e., the left neighboring CTU and the current CTU with the current coding unit. At the reconstruction time in the example, the processing has replaced the samples covered by the white-shaded area (702) in the left neighboring CTU with the gray-shaded area (701) of the current CTU. The RSM may contain more than a single left neighboring CTU when the maximum CTU size is less than 128×128, resulting in the usage of multiple left neighboring CTUs. In some embodiments, when the maximum CTU size is equal to 32×32, the RSM may hold the samples of 15 left neighboring CTUs.

FIG. 7 illustrates the left neighboring CTU and the current CTU denoting the effective reference area because of the RSM design and its continuous update mechanism. The gray shaded area (701) covers the samples stored in the RSM, and the white shaded area (702) covers replaced or unreconstructed samples.

In some embodiments, the BV coding employs the processes specified for inter prediction, but it uses more simplistic rules for candidate list construction. The candidate list construction for inter prediction may consist of five spatial, one temporal, and six history-based candidates. Multiple candidate comparisons are necessary for history-based candidates, avoiding duplicate entries in the final candidate list. Additionally, the list construction may include pairwise averaged candidates. In contrast to that, the IBC list construction process considers two spatial neighbors' BV and five history-based BVs (HBVP) only, where only the first HBVP will compare with spatial candidates when added to the candidate list. While the regular inter prediction uses two different candidate lists, one for the merge mode and the other for the regular mode, the candidate list in IBC is for both cases. However, the merge mode may use up to six candidates of the list, whereas the regular mode uses only the first two candidates. The block vector difference (BVD) coding employs the motion vector difference (MVD) process, resulting in a final BV of any magnitude. It also means that the reconstructed BV may point to an area outside of the reference sample area, requiring a correction by removing the absolute offset for each direction using the modulo operation with the RSM's width and height.

In some embodiments, in AV1, Intra Block Copy (IntraBC) mode uses a vector to locate a prediction block in the same picture of the current block. The vector is called block vector (BV), which may be signaled in the bitstream and the precision for representing BV is integer-point. The prediction process in IntraBC mode is similar to inter-picture prediction, and the main difference is that, in IntraBC, a predictor block is formed from the reconstructed samples (before applying the loop filtering) of the current picture. Therefore, IntraBC may be considered as "motion compensation" within current picture using the block vector as a motion vector. For the current block, a flag used for indicating whether IntraBC is enabled or not for current block is first transmitted in bitstream. Then, if the current block is IntraBC mode, the BV difference is derived by subtracting the predicted BV from the current BV, and then BV difference is classified into four types according to the horizontal and vertical component of the BV difference value. The type information needs to be signaled into the bitstream, and the BV difference value of the two (horizontal and vertical) components may be signaled afterwards.

Figure 8:
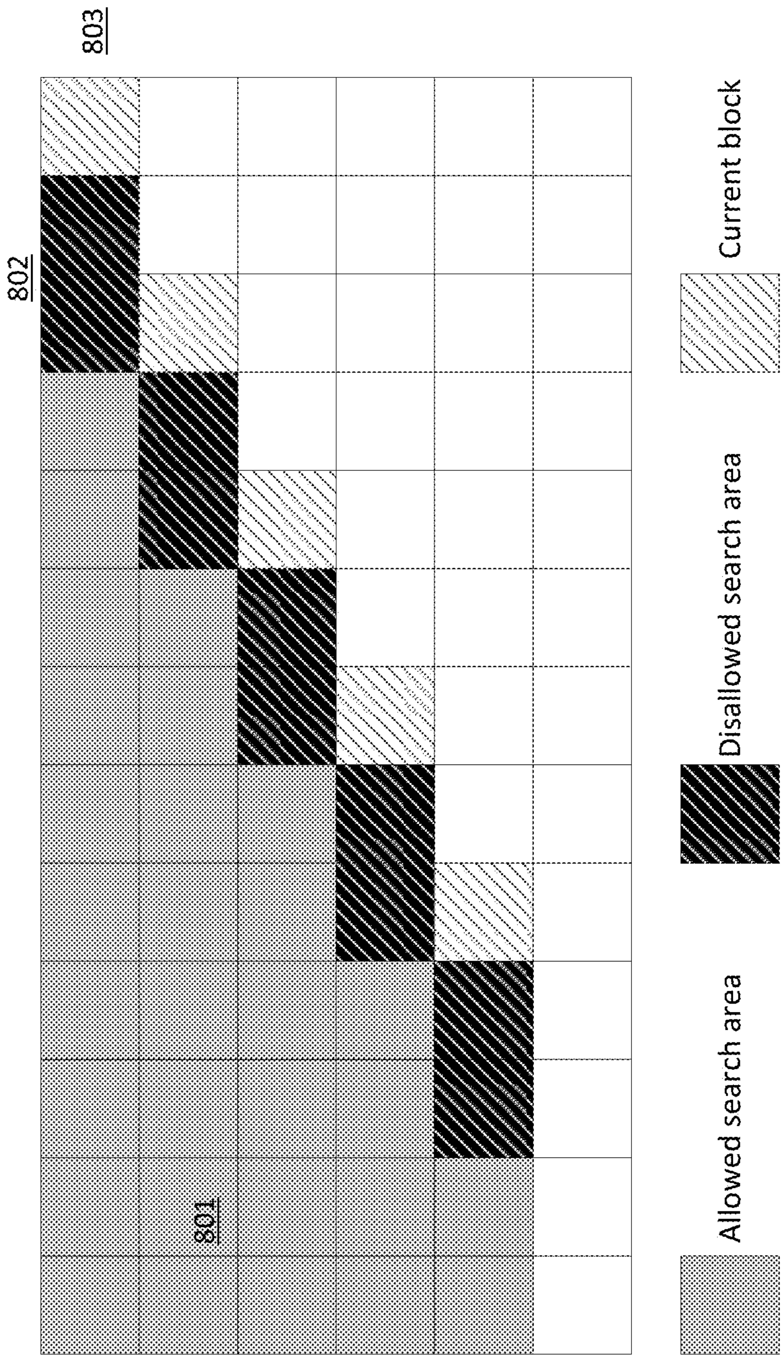
FIG. 8 is a diagram illustrating the prediction area for IntraBC mode, in accordance with various embodiments of the present disclosure.

IntraBC is exceptionally effective for coding screen content, but it also introduces challenges to hardware design. To facilitate the hardware design, the following modifications are adopted. When IntraBC is allowed, the loop filters are disabled, which including a Deblocking filter, CDEF, and the LR. By doing this, a second picture buffer dedicated for enabling IntraBC may be avoided. To facilitate parallel decoding, the prediction cannot exceed the restricted areas. For one superblock, if the coordinate of its top-left position is (x0, y0), the prediction at position (x, y) may be accessed by IntraBC, only if the vertical coordinate is less than y0 and horizontal coordinate is less $x_0+2(y_0-y)$. To allow hardware writing back delay, immediate reconstructed areas cannot be accessed by IntraBC prediction. The restricted immediate reconstructed area may be 1~n super blocks. So on top of modification 2, if the coordinate of one super block's top-left position is $(x_0, y_0)$, the prediction at position (x, y) may be accessed by IntraBC, if vertical coordinate is less than y0 and horizontal coordinate is less than $x_0+2(y_0-y)-D$, where D denotes the immediate reconstructed area that is restricted for IntraBC. When D is two superblock as specified in AVM. FIG. 8 illustrates the prediction area for IntraBC mode in one super block prediction. The gray-shaded area (801) represents an allowed search area. The black-striped area (802) represents a disallowed search area, and the white-striped area (803) represents the current block.

In some embodiments, a redesign of IntraBC mode with local reference range is disclosed on top of AV1 codec. The disclosed IntraBC assumes that, one SB size of "on-chip" memory (referred as Reference Sample Memory, or RSM) is allocated to store the reference samples, with the memory reuse mechanism on 64×64 basis applied. The following changes are made on top of the design of IntraBC in AV1. The largest block size in IntraBC mode is limited as 64×64. The reference block and the current block should be in the same SB row. The reference block may only be located in the current SB or one SB on the left to the current SB. When any of the 64×64 unit reference sample memory begins to update with the reconstructed samples from the current SB, the previous stored reference samples (from the left SB) in the whole 64×64 unit are marked as unavailable for generating prediction samples of IntraBC.

Figure 9:
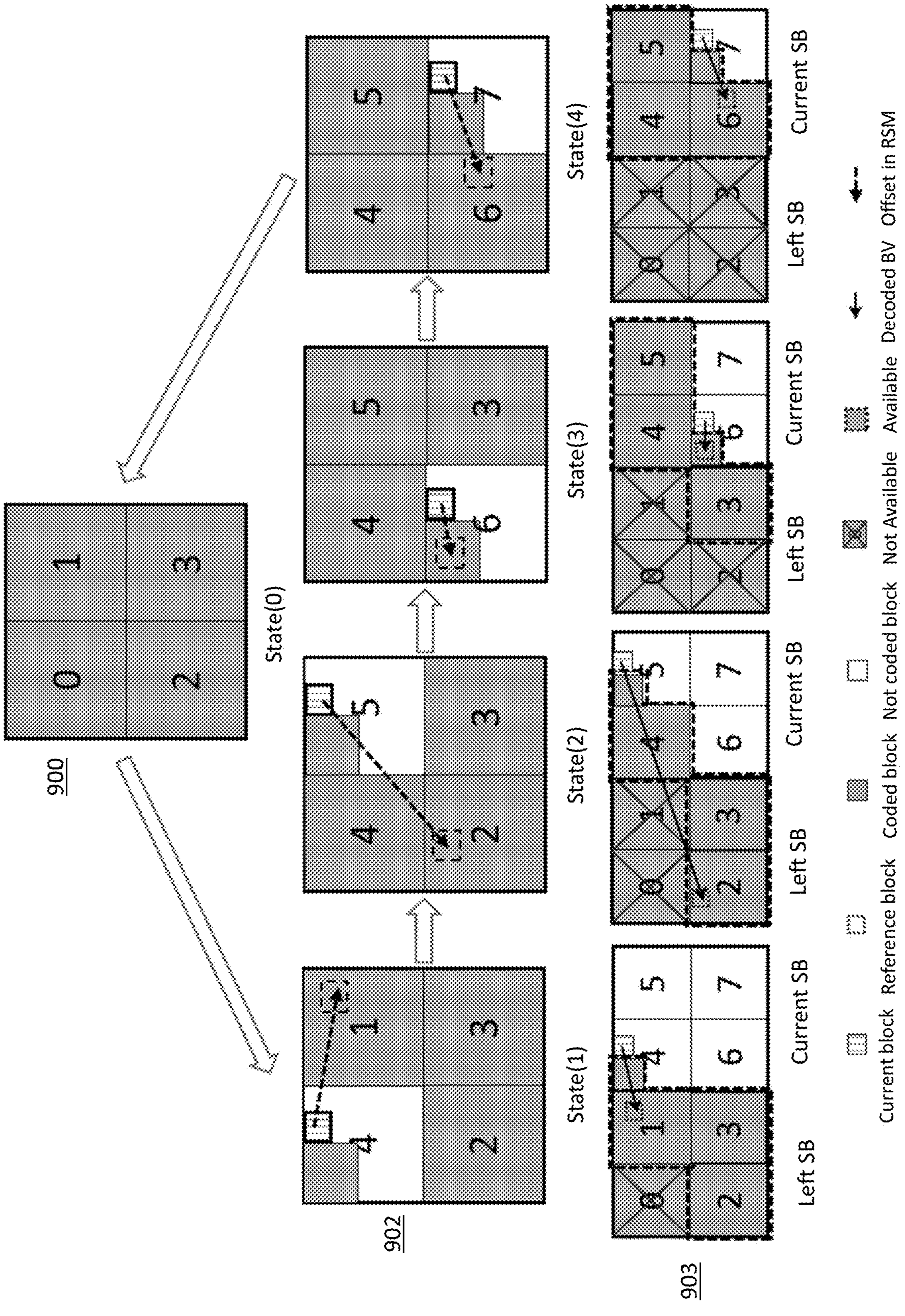
FIG. 9 is a diagram illustrating the memory update process in the RSM during decoding of a CTU, in accordance with various embodiments of the present disclosure.

FIG. 9 illustrates an example of such memory reuse mechanism using the disclosed method. At the beginning of coding each SB, the RSM stores samples of the previous coded SB state (0). When the current block is located in one of the four 64×64 regions in the current SB, the corresponding region in the RSM will be emptied and used to store the samples of current 64×64 coding region. In this way, the samples in the RSM are gradually updated by the samples in the current SB. When the current SB has been coded completely, the entire RSM is filled with all the samples of the current SB state (4). In this example, the current B is partitioned firstly using quad-tree split (900). The coding order of the four 64×64 regions will then be top-left, top-right, bottom-left and bottom-right. In other block split decisions, the RSM update process is similar, i.e., replacing the respective regions in the RSM using the reconstructed samples in the current SB. The top row (902) shows the RSM point of view. The bottom row (903) shows the picture point of view.

Figure 10:
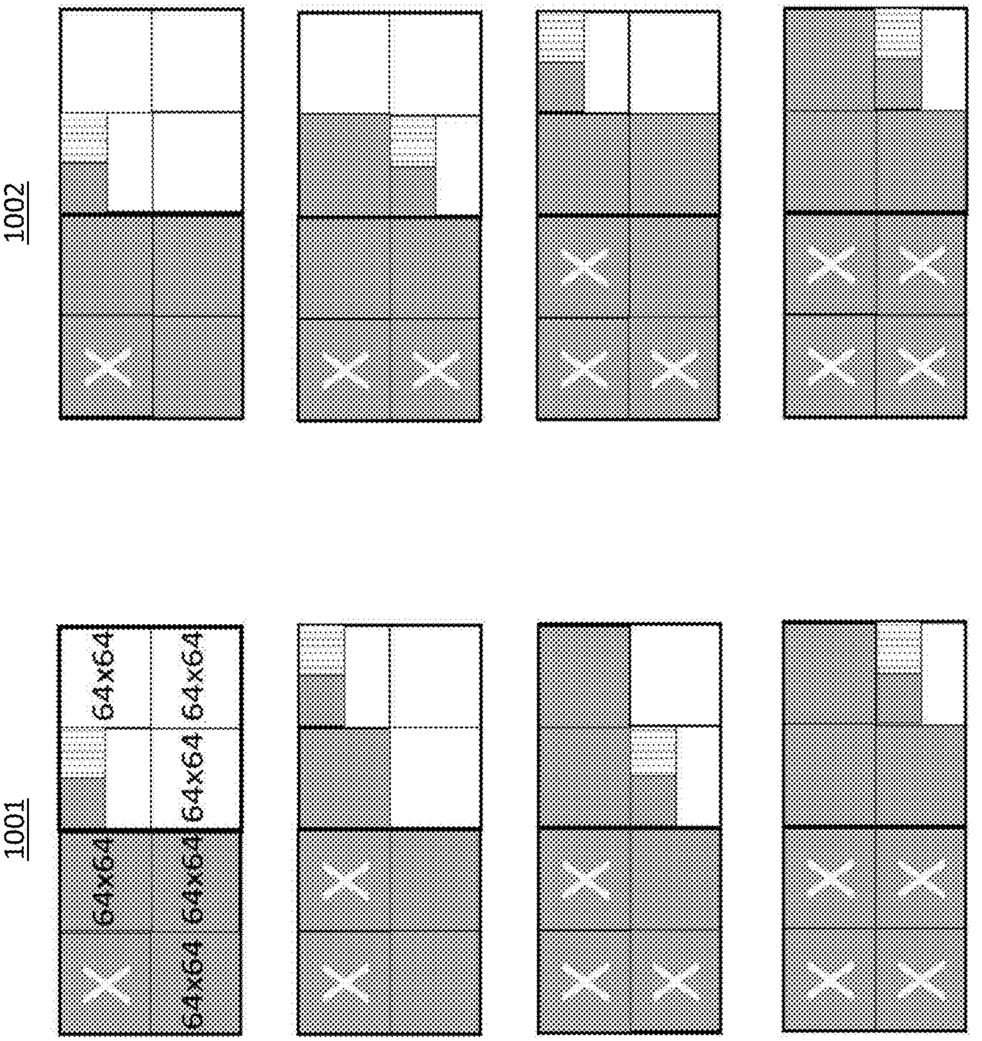
FIG. 10 is a diagram illustrating the memory update process in the RSM during decoding of a SB, in accordance with various embodiments of the present disclosure.

FIG. 10 illustrates the memory update process in the RSM during decoding of a SB with horizontal split 1001 or vertical split 1002 at the SB root. Depending on the location of the current coding block relative to the current SB, the following applies. If current block falls into the top-left 64×64 block of the current SB, then in addition to the already reconstructed samples in the current SB, it may also refer to the reference samples in the bottom-right, bottom-left and top-right 64×64 block of the left SB. If current block falls into the top-right 64×64 block of the current SB, then in addition to the already reconstructed samples in the current SB, if luma sample located at (0, 64) relative to the current SB has not yet been reconstructed, the current block may also refer to the reference samples in the bottom-left 64×64 block and bottom-right 64×64 block of the left SB. Otherwise, the current block may also refer to reference samples in bottom-right 64×64 block of the left SB. If current block falls into the bottom-left 64×64 block of the current SB, then in addition to the already reconstructed samples in the current SB, if luma location (64, 0) relative to the current SB has not yet been reconstructed, the current block may also refer to the reference samples in the top-right 64×64 block and bottom-right 64×64 block of the left SB. Otherwise, the current block may also refer to the reference samples in the bottom-right 64×64 block of the left SB. If current block falls into the bottom-right 64×64 block of the current SB, it may only refer to the already reconstructed samples in the current SB.

Figure 11:
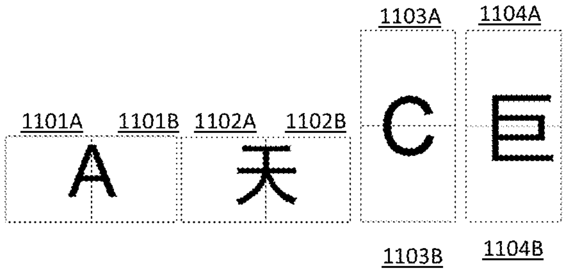
FIG. 11 is a diagram illustrating examples of symmetry in screen content pictures, in accordance with various embodiments of the present disclosure.

In some embodiments, screen content coding tools like Intra Block Copy (IBC) generate a prediction block by directly copying a prior coded reference region in the same picture. Symmetry is often observed in video content, especially in text character regions and computer-generated graphics in screen content sequences, as shown in FIG. 11. Therefore, a specific screen content coding tool considering the symmetry would be efficient to compress such kinds of video contents. In FIG. 11 horizontal symmetry is exemplified between content 1101A and 1101B as well as content 1102A and 1102B. Vertical symmetry is exemplified between content 1103A and 1103B as well as content 1104A and 1104B.

In JVET-Z0159, a Reconstruction-Reordered IBC (RR-IBC) mode is disclosed for screen content video coding. When it is applied, the samples in a reconstruction block are flipped according to a flip type of the current block. At the encoder side, the original block is flipped before motion search and residual calculation, while the prediction block is derived without flipping. At the decoder side, the reconstruction block is flipped back to restore the original block.

Two flip methods, horizontal flip and vertical flip, are supported for RR-IBC coded blocks. A syntax flag is firstly signalled for an IBC AMVP coded block, indicating whether the reconstruction is flipped, namely ibc_flip_flag, and if it is flipped, another flag is further signaled specifying the flip type, namely ibc_flip_type. For IBC merge, the flip type is inherited from neighbouring blocks, without syntax signalling. Considering the horizontal or vertical symmetry, the current block and the reference block are normally aligned horizontally or vertically. Therefore, when a horizontal flip is applied, the vertical component of the BV is not signaled and inferred to be equal to 0. Similarly, the horizontal component of the BV is not signaled and inferred to be equal to 0 when a vertical flip is applied.

Figure 12A:
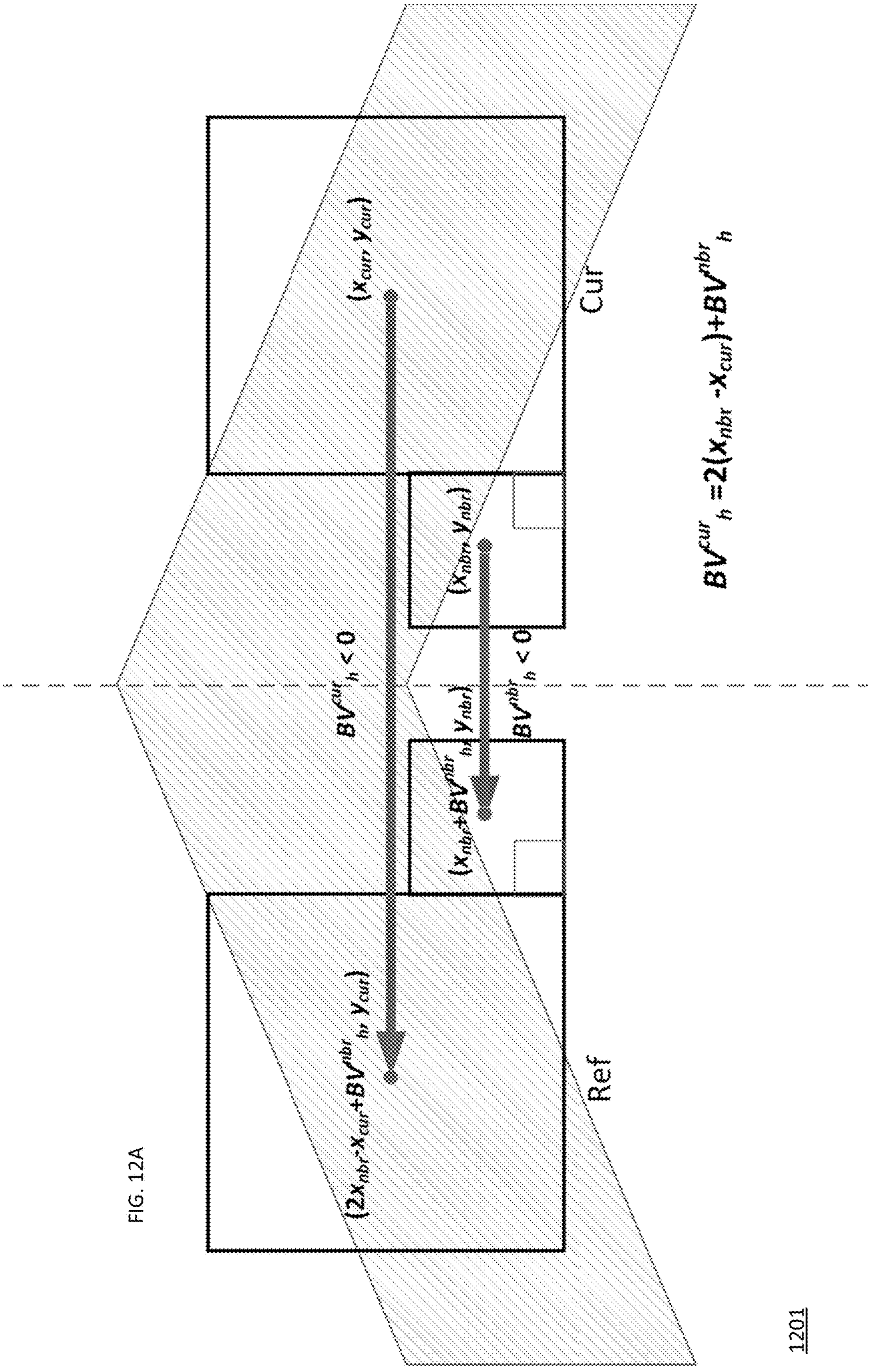
FIG. 12A and FIG. 12B are diagrams illustrating BV adjustments, in accordance with various embodiments of the present disclosure.
Figure 12B:
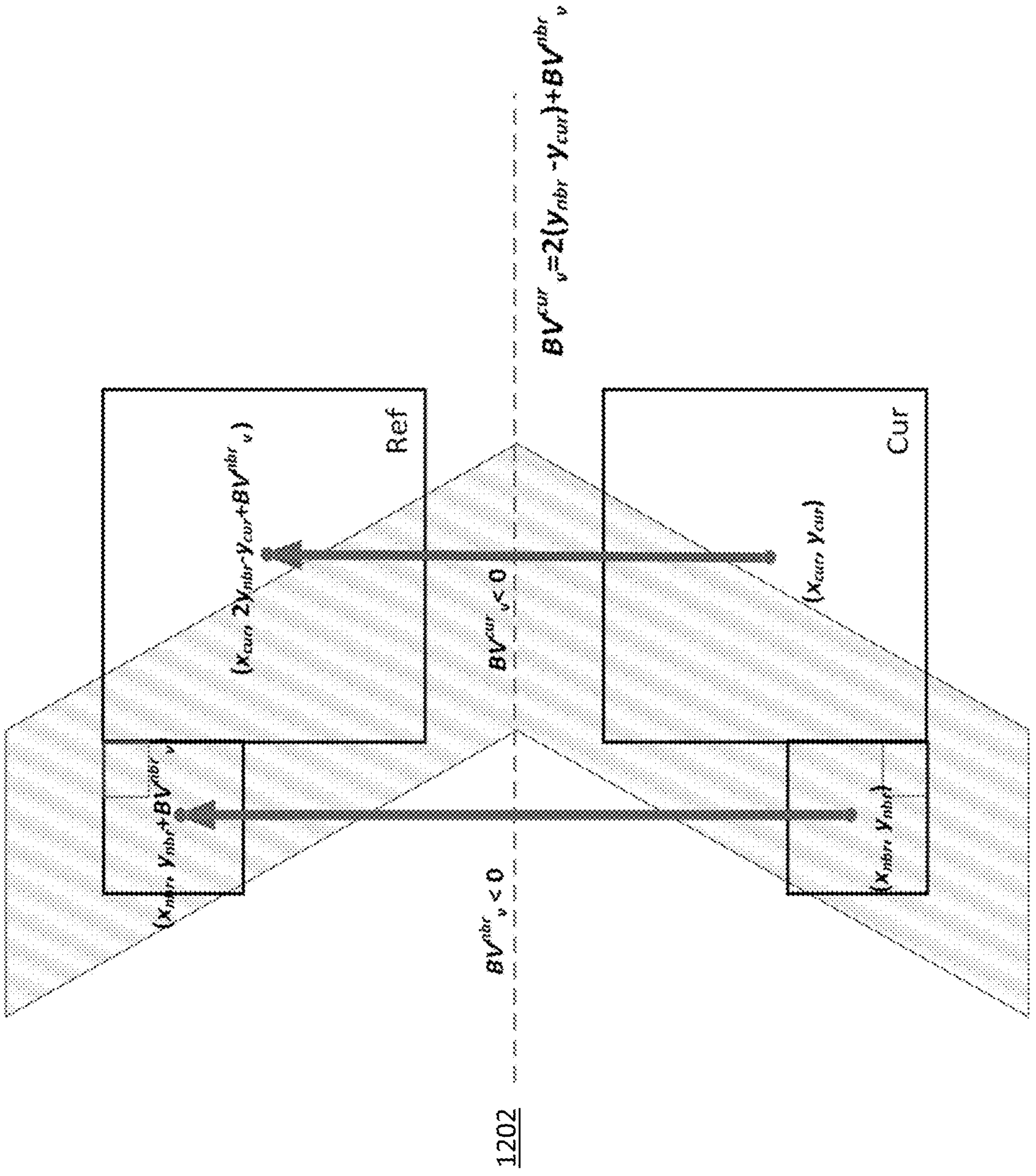

FIG. 12A illustrates a BV adjustment for horizontal flip 1201 and FIG. 12B illustrates a BV adjustment for a vertical flip 1202. To better utilize the symmetry property, a flip-aware BV adjustment approach is applied to refine the block vector candidate. For example, as shown in FIG. 12A and FIG. 12B, $(x_{nbr}, y_{nbr})$ and $(x_{cur}, y_{cur})$ represent the coordinates of the center sample of the neighboring block and the current block, respectively, $BV^{nbr}$ and $BV^{cur}$ denotes the BV of the neighboring block and the current block, respectively. Instead of directly inheriting the BV from a neighboring block, the horizontal component of $BV^{cur}$ is calculated by adding a motion shift to the horizontal component of $BV^{nbr}$ (denoted as $BV^{nbr}_h$) in case that the neighboring block is coded with a horizontal flip, i.e., $BV^{cur}_h=2(x_{nbr}-x_{cur})+BV^{nbr}_h$. Similarly, the vertical component of $BV^{cur}$ is calculated by adding a motion shift to the vertical component of $BV^{nbr}$ (denoted as $BV^{nbr}_v$) in case that the neighboring block is coded with a vertical flip, i.e., $BV^{cur}_v=2(y_{nbr}-y_{cur})+BV^{nbr}_v$.

In the reconstruction reordered IBC design, for IntraBC AMVP mode, a flag first signaled to indicate whether flip method is applied, when flip method is applied, another flag indicating whether it is horizontal flip or vertical flip is further signaled. For SCC, due to less residuals, signalling of these modes are expensive.

The embodiments of the present disclosure may be used separately or combined in any order. Furthermore, the embodiments of the present disclosure may be implemented by processing circuitry (e.g., one or more processors or one or more integrated circuits). In one example, the one or more processors execute a program that is stored in a non-transitory computer-readable medium.

In some embodiments, as an example, the reconstruction of current block is flipped according to a certain flip type (e.g., flipping pattern). However, the same operations may also apply to other transformations of reconstruction block, including, but not limited to rotation and zooming.

Figure 13:
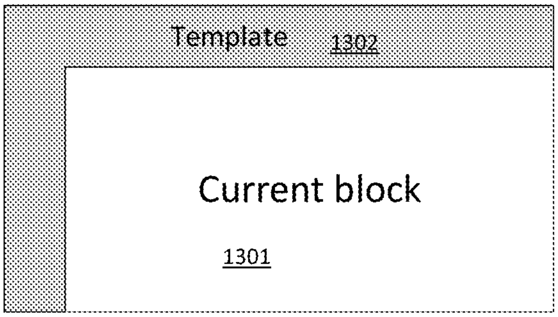
FIG. 13 is a diagram illustrating a template of a block, in accordance with various embodiments of the present disclosure.

In the following, when saying a template, it may refer to the top, left, right and bottom neighboring samples of a block. FIG. 13 is an exemplary diagram of a template of a block, where the grey area, consisting of top and left neighboring reconstructed sample, indicates the template (1302) of current block (1301).

In some embodiments, the selection of whether reconstruction flipping is applied, and/or the selection of flipping pattern (e.g., whether horizontal flip or vertical flip) may be predicted using the neighboring reconstruction samples of current block and the reference block. The selection may be referred to by using neighboring reconstruction samples as template matching or boundary smoothness checking in accordance with embodiments of the present disclosure.

Figure 14A:
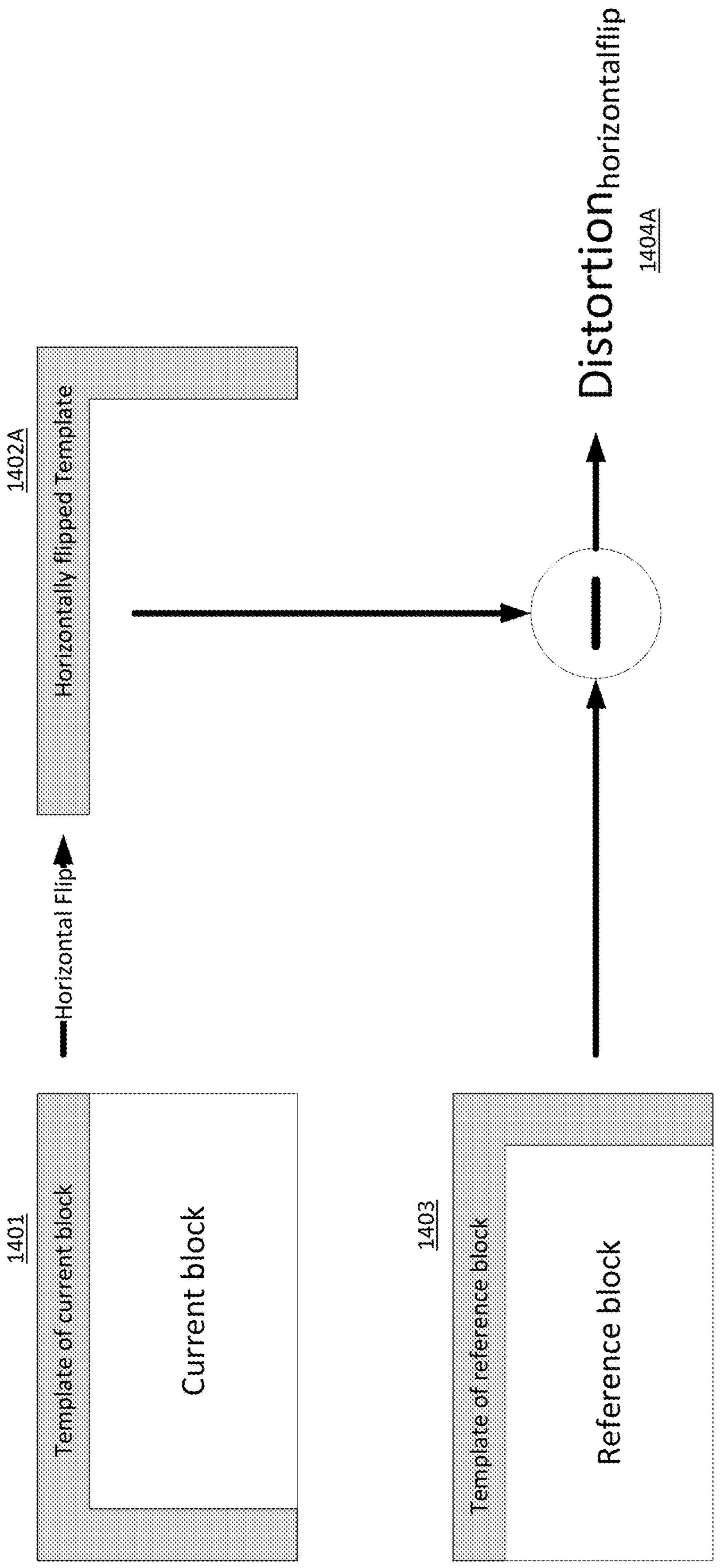
FIGS. 14A-C are diagrams illustrating the distortion calculation using various flips, in accordance with various embodiments of the present disclosure.
Figure 14B:
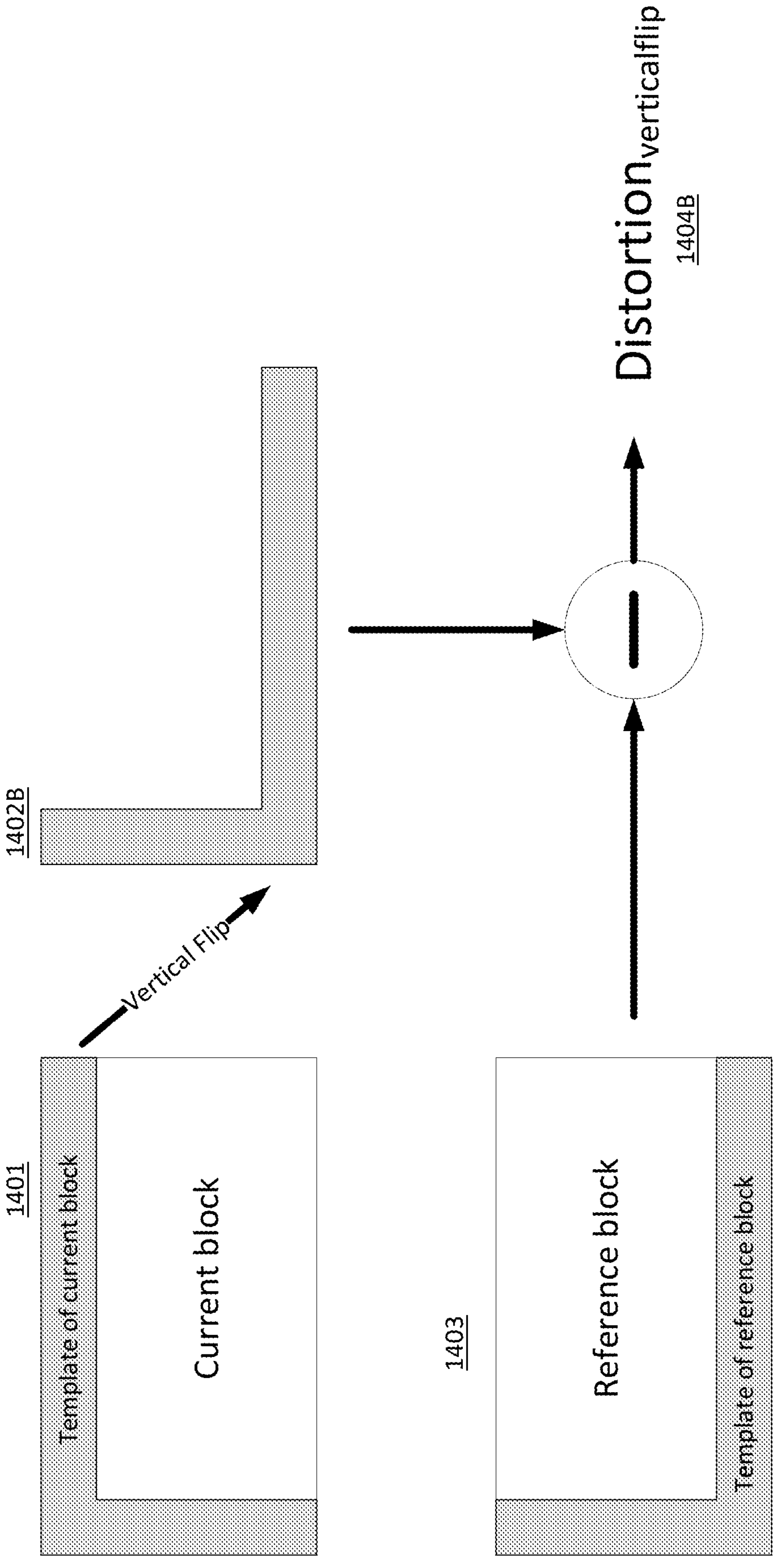
Figure 14C:
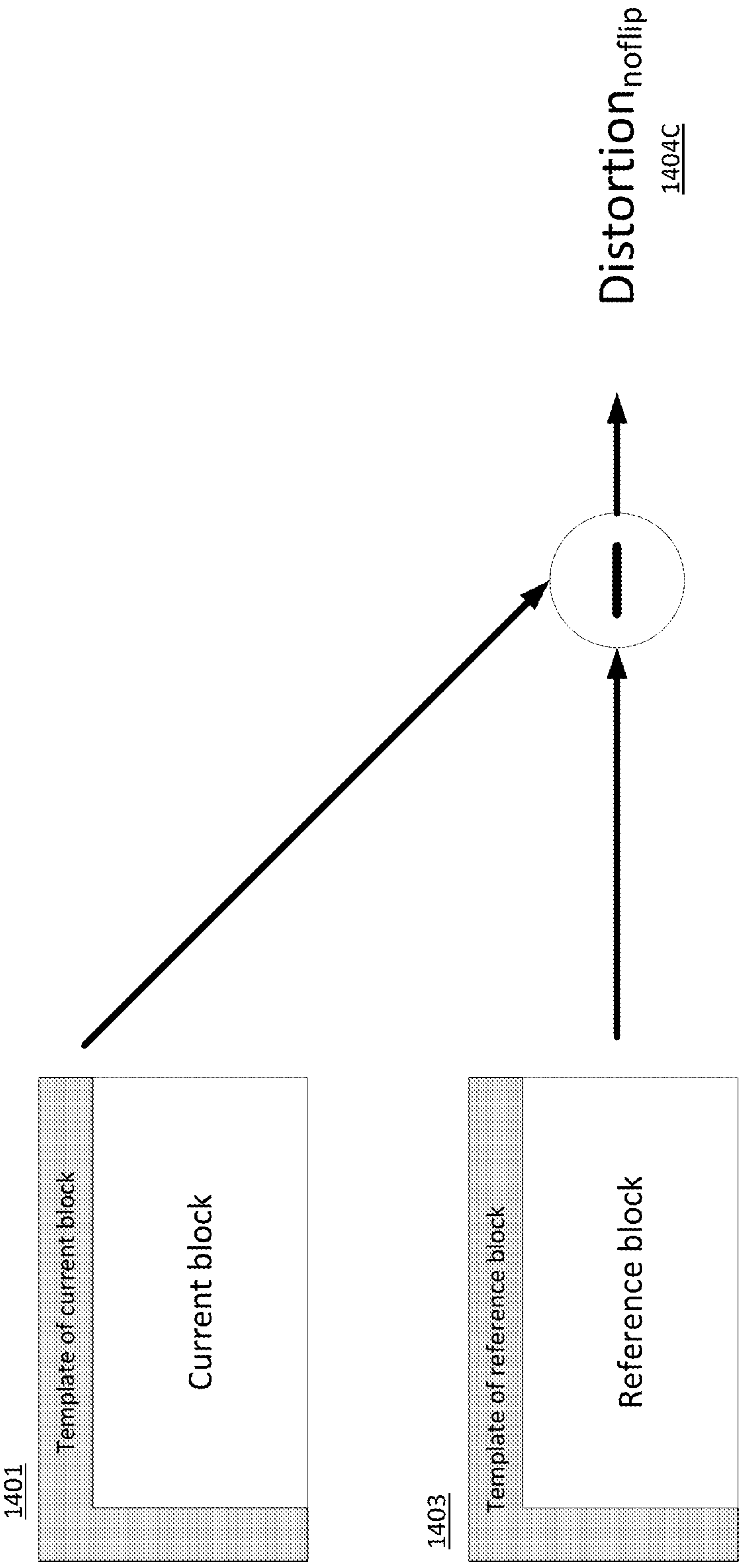

In some embodiments, different candidate flipping patterns (including no flipping) may be applied on the template of a current block, then the distortion between the template of reference block 1403 and the flipped template 1402 of current block 1401 may be calculated, then the selection which provides the minimum distortion may be derived as the predicted flip pattern. An example is shown in FIGS. 14A-C for calculating the template distortion 1404 for three different flipping patterns (horizontal flip, vertical flip, no flip), where the distortion (e.g., 1404A, 1404B, 1404C) associated with each flipping pattern is compared, and the prediction mode with minimum distortion is derived as the predicted flipping pattern. The distortion includes, but is not limited to, SAD, SSE, SATD. In FIG. 14A, the template is horizontally flipped (1402A), and in FIG. 14B, the template is vertically flipped (1402B).

In some embodiments, the reconstructed residual of a current block may be flipped using the candidate flip types (including no flip), and the boundary samples of the reconstructed block together with the neighboring reconstructed samples are used as input to calculate a smoothness score, and the flip type that provides the highest smoothness score is derived as the predicted IBC flip type.

Figure 15:
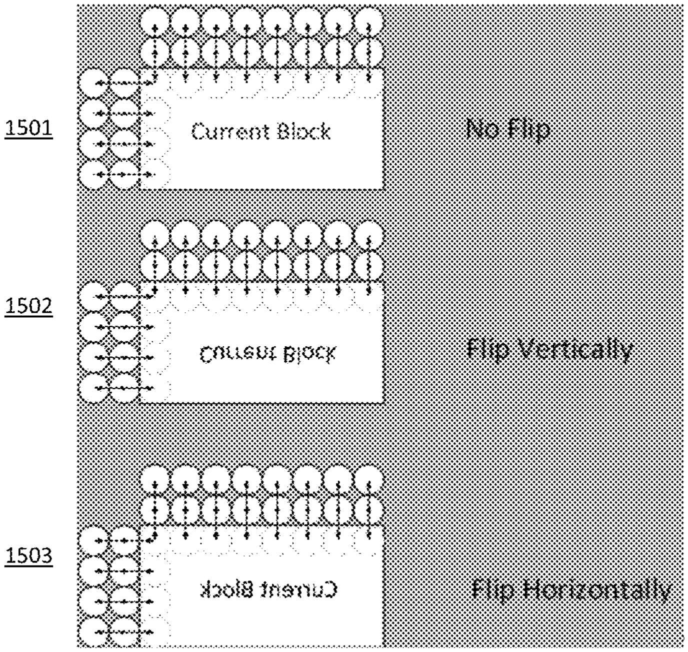
FIG. 15 is a diagram illustrating a reconstruction block after various flips, in accordance with various embodiments of the present disclosure.

In some embodiments, the smoothness may be calculated using the spatially neighboring reconstructed samples and the boundary samples of a current block using a certain flip type no flip 1501, flip vertically 1502, or flip horizontally 1503 as shown in FIG. 15. The smoothness may be measured using one of the following equations $$\sum_{i=0}^{W}|r_{i,-1}-p_{i,0}|+\sum_{j=0}^{H}|r_{-1,j}-p_{0,j}| \quad \text{eqn. (1)}$$

$$\sum_{i=0}^{W}|2\cdot r_{i,-1}-r_{i,-2}-p_{i,0}|+\sum_{j=0}^{H}|2\cdot r_{-1,j}-r_{-2,j}-p_{0,j}| \quad \text{eqn. (2)}$$

where r represents the neighboring reconstructed sample array, and p represents the reconstruction block of current block.

In some embodiments, instead of signaling the flag ibc_flip_flag explicitly, a flag is signaled to indicate whether IBC is using a flip type that is consistent with the predicted selection. For example, the flag may be used to indicate that a block is to be predicted with a flip mode (e.g., flipping operation is applied to block).

In some embodiments, instead of signaling the flag ibc_flip_type explicitly, a flag is signaled to indicate whether the selected IBC flip type is consistent with the predicted IBC flip type. In some embodiments, when this flag is signaled to be false, all the flip types excluding the predicted flip type are reordered based on the distortion or smoothness metric calculated as discussed above, and the reordered index may be binarized and signaled.

In some embodiments, the flag ibc_flip_flag may be signaled to indicate whether the horizontal flip or vertical flip is used or not. If this flag is true, the selected IBC flip type is the same with the predicted IBC flip type. Otherwise, there is no flip operation for the IBC block.

In some embodiments, the flag ibc_flip_flag may be signaled to indicate whether the horizontal flip or vertical flip is used or not. If this flag is true, another ibc_flip_pred_flag may be signaled to indicate whether the predicted IBC flip type is used for the IBC flip type or not. Otherwise, there is no flip operation for the IBC block. When the ibc_flip_pred_flag is true, IBC flip type is the same with the predicted IBC flip type, otherwise, the other flip type is applied for the IBC block.

In some embodiments, each flip type may be associated with an index value, and all the flip types are reordered using the distortion or smoothness metric calculated as discussed above, where the reordered index may be binarized and signalled.

In some embodiments, the absolute value of block vector difference is used to derive the contexts that are used for entropy coding the flags discussed above, which indicates whether a predicted value and a selected value are the same or not.

In some embodiments, whether flipping is used and the flip type information may be derived by a combination of template matching and the following: checking the parity of the coefficient block of current coding block. For example, the number of even coefficients (including 0) in the block being an even number may be used to infer flipping is used. Which direction of flipping may be derived by using template matching. Other derivation methods based on the parity of coefficients may be derived in a similar way. In some embodiments, the parity check of a coefficient may not need to be combined with template matching. It may be used alone to derive information related to flipping.

Figure 16:
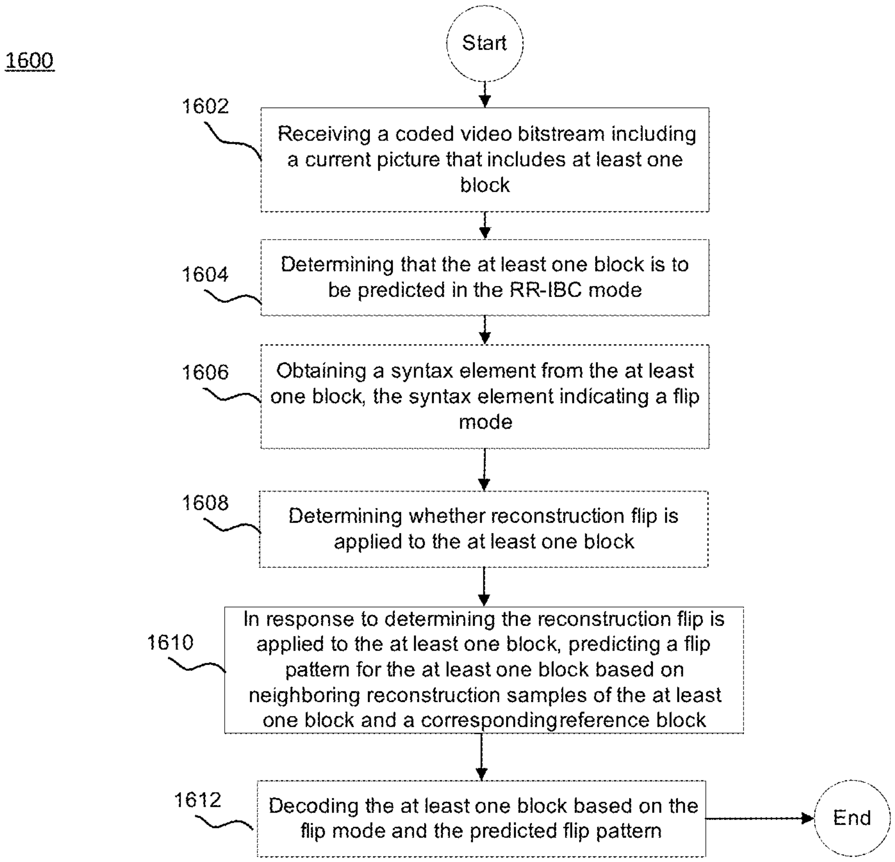
FIG. 16 illustrates a flow chart of an embodiment for prediction and signalling for Intra BC flip type, in accordance with various embodiments of the present disclosure.

FIG. 16 illustrates an embodiment of a process (1600) for decoding a block based on a flip mode. The process (1600) may be performed by a decoder such as decoder (210). The process may star at operation (1602) where a coded video bitstream is received. The coded video bitstream may include a current picture that includes at least one block. The process proceeds to operation (1604) where it is determined that the at least one block is to be predicted in the RR-IBC mode. The process proceeds to operation (1606) a syntax element is obtained from the at least one block. The syntax element may indicate a flip mode. The process proceeds to operation (1608) where it is determined whether the reconstruction flip is applied to the at least one block. The process proceeds to operation (1610) where in response to determining the reconstruction flip is applied to the at least one block, a flip pattern for the at least one block is predicted based on the at least one block and a corresponding reference block. For example, the predicted flip pattern may be one of the horizontal flip pattern, vertical flip pattern, or no flip pattern. The process proceeds to operation (1612) were the at least one block is decoded based on the flip mode and the predicted flip pattern.

The process proceeds to operation (1606) where a flip mode is selected based on the predicted flip mode and signaling information included in the coded video bitstream. The process proceeds to operation (1608) where the at least one block is decoded based on the selected flip mode.

The techniques of embodiments of the present disclosure described above, may be implemented as computer software using computer-readable instructions and physically stored in one or more computer-readable media. For example, FIG. 17 shows a computer system (1700) suitable for implementing embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 17:
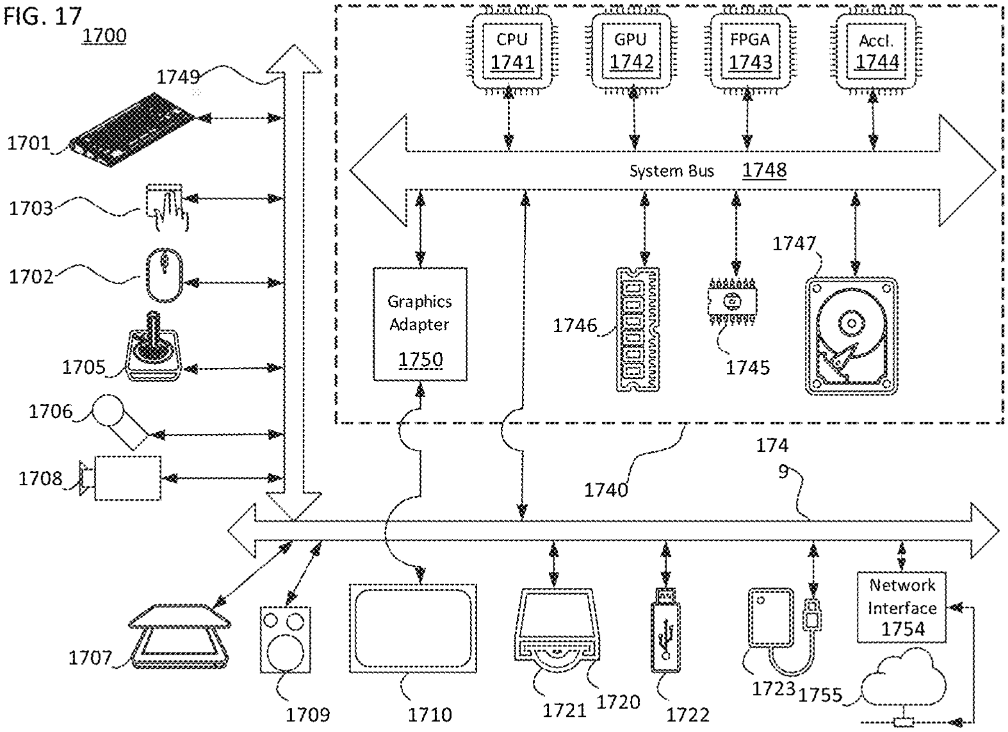
FIG. 17 illustrates an example computer system, in accordance with various embodiments of the present disclosure.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove, joystick (1705), microphone (1706), scanner (1707), and camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove, or joystick (1705), but there may also be tactile feedback devices that do not serve as input devices). For example, such devices may be audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1700) may also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700); others are commonly integrated into the core of the computer system 1700 by attachment to a system bus as described below (for example Ethernet interface into a PC computer system or cellular network interface into a smartphone computer system). Using any of these networks, computer system (1700) may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment (1755). Certain protocols and protocol stacks may be used on each of those networks and network interfaces as described above.

Aforementioned human interface devices, human-accessible storage devices, and network interfaces (1754) may be attached to a core (1740) of the computer system (1700).

The core (1740) may include one or more Central Processing Units (CPU) (1741), Graphics Processing Units (GPU) (1742), specialized programmable processing units in the form of Field Programmable Gate Areas (FPGA) (1743), hardware accelerators (1744) for certain tasks, and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) may be accessible in the form of one or more physical plugs to enable extensions by additional CPUs, GPU, and the like. The peripheral devices may be attached either directly to the core's system bus (1748), or through a peripheral bus (1749). Architectures for a peripheral bus include PCI, USB, and the like. A graphics adapter (1750) may be included in the core (1740).

CPUs (1741), GPUs (1742), FPGAs (1743), and accelerators (1744) may execute certain instructions that, in combination, may make up the aforementioned computer code. That computer code may be stored in ROM (1745) or RAM (1746). Transitional data may be also be stored in RAM (1746), whereas permanent data may be stored for example, in the internal mass storage (1747). Fast storage and retrieve to any of the memory devices may be enabled through the use of cache memory, that may be closely associated with one or more CPU (1741), GPU (1742), mass storage (1747), ROM (1745), RAM (1746), and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture (1700), and specifically the core (1740) may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core (1740) that are of non-transitory nature, such as core-internal mass storage (1747) or ROM (1745). The software implementing various embodiments of the present disclosure may be stored in such devices and executed by core (1740). A computer-readable medium may include one or more memory devices or chips, according to particular needs. The software may cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system may provide functionality as a result of logic hardwired or otherwise embodied in a circuit (for example: accelerator (1744)), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions in the blocks may occur out of the order in the figures. For example, two blocks shown in succession may, in fact, be executed concurrently or substantially concurrently, or the blocks may sometimes be executed in the reverse order, depending upon the functionality involved. Each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor in a video decoder, the method including: receiving a coded video bitstream including a current picture that includes at least one block; determining that the at least one block is to be predicted in a reconstruction-reordered intra block copy (RR-IBC) mode; obtaining a syntax element from the at least one block, the syntax element indicating a flip mode; determining whether reconstruction flip is applied to the at least one block; in response to determining the reconstruction flip is applied to the at least one block, predicting a flip pattern for the at least one block based on neighboring reconstruction samples of the at least block and a corresponding reference block of the at least one block; and decoding the at least one block based on the flip mode and the predicted flip pattern.

(2) The method according to feature (1), in which the predicted flip pattern is one of a horizontal flip pattern, a vertical flip pattern, and a no flip pattern.

(3) The method according to feature (2), in which the predicting the flip pattern includes calculating a template distortion for each flip pattern, and in which the predicted flip pattern is the flip pattern having a minimum distortion.

(4) The method according to feature (3), in which the at least one block includes a template that includes neighboring reconstructed samples on at least two sides of the at least one block, in which determining the template distortion for the horizontal flip pattern includes determining a distortion between the template of the at least one block and the template applied to the corresponding reference block in which the template is horizontally flipped, in which determining the template distortion for the vertical flip pattern includes determining a distortion between the template of the at least one block and the template applied to the corresponding reference block in which the template is vertically flipped, and in which determining the template distortion for the no flip pattern includes determining a distortion between the template of the at least one block and the template applied to the corresponding reference block in which the template is not flipped.

(5) The method according to feature (2), in which the predicting the flip pattern includes calculating a smoothness score for each flip pattern, and in which the predicted flip pattern is the flip pattern having a highest smoothness score.

(6) The method according to feature (5), in which the smoothness score for the no flip pattern is based on neighboring reconstructed samples of the at least one block and boundary samples of the at least one block, in which the smoothness score for the horizontal flip pattern is based on neighboring reconstructed samples of the at least one block that is horizontally flipped and boundary samples of the at least one block that is horizontally flipped, and in which the smoothness score for the vertical flip pattern is based on neighboring reconstructed samples of the at least one block that is vertically flipped and boundary samples of the at least one block that is vertically flipped.

(7) The method according to feature (2), in which a selected flip pattern is the predicted flip pattern based on a determination the coded video bitstream includes information that indicates using the predicted flip pattern.

(8) The method according to feature (2), in which a selected flip pattern is the no flip pattern on a determination the coded video bitstream includes information that indicates not to use the predicted flip pattern.

(9) A video decoder including: at least one memory configured to store computer program code; and at least one processor configured to access the computer program code and operate as instructed by the computer program code, the computer program code including: receiving code configured to cause the at least one processor to receive a coded video bitstream including a current picture that includes at least one block, first determining code configured to cause the at least one processor to determine that the at least one block is to be predicted in a reconstruction-reordered intra block copy (RR-IBC) mode, obtaining code configured to cause the at least one processor to obtain a syntax element from the at least one block, the syntax element indicating a flip mode, second determining code configured to cause the at least one processor to determine whether reconstruction flip is applied to the at least one block, predicting code configured to cause the at least one processor to, in response to determining the reconstruction flip is applied to the at least one block, determine a flip pattern for the at least one block based on neighboring reconstruction samples of the at least block and a corresponding reference block of the at least one block, and decoding code configured to cause the at least one processor to decode the at least one block based on the flip mode and the predicted flip pattern.

(10) The video decoder according to feature (9), in which the predicted flip pattern is one of a horizontal flip pattern, a vertical flip pattern, and a no flip pattern.

(11) The video decoder according to feature (10), in which the predicting code is further configured to cause the processor to calculate a template distortion for each flip pattern, and in which the predicted flip pattern is the flip pattern having a minimum distortion.

(12) The video decoder according to feature (11), in which the at least one block includes a template that includes neighboring reconstructed samples on at least two sides of the at least one block, in which the predicting code is further configured to cause the at least one processor to determine the template distortion for the horizontal flip pattern by determining a distortion between the template of the at least one block and the template applied to the corresponding reference block in which the template is horizontally flipped, in which the predicting code is further configured to cause the at least one processor to determine the template distortion for the vertical flip pattern by determining a distortion between the template of the at least one block and the template applied to the corresponding reference block in which the template is vertically flipped, and in which the predicting code is further configured to cause the at least one processor to determine the template distortion for the no flip pattern by determining a distortion between the template of the at least one block and the template applied to the corresponding reference block in which the template is not flipped.

(13) The video decoder according to feature (9), in which the predicting code is further configured to cause the at least one processor to predict the flip pattern by calculating a smoothness score for each flip pattern, and in which the predicted flip pattern is the flip pattern having a highest smoothness score.

(14) The video decoder according to feature 13, in which the smoothness score for the no flip pattern is based on neighboring reconstructed samples of the at least one block and boundary samples of the at least one block, in which the smoothness score for the horizontal flip pattern is based on neighboring reconstructed samples of the at least one block that is horizontally flipped and boundary samples of the at least one block that is horizontally flipped, and in which the smoothness score for the vertical flip pattern is based on neighboring reconstructed samples of the at least one block that is vertically flipped and boundary samples of the at least one block that is vertically flipped.

(15) The video decoder according to feature 9, in which a selected flip pattern is the predicted flip pattern based on a determination the coded video bitstream includes information that indicates using the predicted flip pattern.

(16) The video decoder according to feature 9, in which a selected flip pattern is the no flip pattern on a determination the coded video bitstream includes information that indicates not to use the predicted flip pattern.

(17) A non-transitory computer readable medium having instructions stored therein, which when executed by a processor in a video decoder cause the processor to execute a method including receiving a coded video bitstream including a current picture that includes at least one block; determining that the at least one block is to be predicted in a reconstruction-reordered intra block copy (RR-IBC) mode; obtaining a syntax element from the at least one block, the syntax element indicating a flip mode; determining whether reconstruction flip is applied to the at least one block; in response to determining the reconstruction flip is applied to the at least one block, predicting a flip pattern for the at least one block based on neighboring reconstruction samples of the at least block and a corresponding reference block of the at least one block; and decoding the at least one block based on the flip mode and the predicted flip pattern.

(18) The non-transitory computer readable medium according to feature (17), in which the predicted flip pattern is one of a horizontal flip pattern, a vertical flip pattern, and a no flip pattern.

(19) The non-transitory computer readable medium according to feature (17), in which the predicting the flip pattern includes calculating a template distortion for each flip pattern, and in which the predicted flip pattern is the flip pattern having a minimum distortion.

(20) The non-transitory computer readable medium according to feature (19), in which the at least one block includes a template that includes neighboring reconstructed samples on at least two sides of the at least one block, in which determining the template distortion for the horizontal flip pattern includes determining a distortion between the template of the at least one block and the template applied to the corresponding reference block in which the template is horizontally flipped, in which determining the template distortion for the vertical flip pattern includes determining a distortion between the template of the at least one block and the template applied to the corresponding reference block in which the template is vertically flipped, and in which determining the template distortion for the no flip pattern includes determining a distortion between the template of the at least one block and the template applied to the corresponding reference block in which the template is not flipped.

What is claimed is:

1. A method performed by at least one processor in a video decoder, the method comprising:

receiving a coded video bitstream including a current picture that includes at least one block includes a template that includes neighboring reconstructed samples on at least two sides of the at least one block;

determining that the at least one block is to be predicted in a reconstruction-reordered intra block copy (RR-IBC) mode;

obtaining a syntax element from the at least one block, the syntax element indicating a flip mode;

determining whether reconstruction flip is applied to the at least one block;

in response to determining the reconstruction flip is applied to the at least one block, predicting a flip pattern for the at least one block based on neighboring reconstruction samples of the at least block and a corresponding reference block of the at least one block, the predicting the flip pattern including calculating a template distortion for each flip pattern, and wherein the predicted flip pattern is the flip pattern having a minimum distortion, the template distortion for the flip pattern including determining a distortion between the template of the at least one block and the template applied to the corresponding reference block in which the template is flipped; and decoding the at least one block based on the flip mode and the predicted flip pattern.

2. The method according to claim 1, wherein the predicted flip pattern is one of a horizontal flip pattern, a vertical flip pattern, and a no flip pattern.

3. The method according to claim 2, wherein determining the template distortion for the horizontal flip pattern includes determining a distortion between the template of the at least one block and the template applied to the corresponding reference block in which the template is horizontally flipped, wherein determining the template distortion for the vertical flip pattern includes determining a distortion between the template of the at least one block and the template applied to the corresponding reference block in which the template is vertically flipped, and wherein determining the template distortion for the no flip pattern includes determining a distortion between the template of the at least one block and the template applied to the corresponding reference block in which the template is not flipped.

4. The method according to claim 2, wherein the predicting the flip pattern includes calculating a smoothness score for each flip pattern, and wherein the predicted flip pattern is the flip pattern having a highest smoothness score.

5. The method according to claim 4, wherein the smoothness score for the no flip pattern is based on neighboring reconstructed samples of the at least one block and boundary samples of the at least one block, wherein the smoothness score for the horizontal flip pattern is based on neighboring reconstructed samples of the at least one block that is horizontally flipped and boundary samples of the at least one block that is horizontally flipped, and wherein the smoothness score for the vertical flip pattern is based on neighboring reconstructed samples of the at least one block that is vertically flipped and boundary samples of the at least one block that is vertically flipped.

6. The method according to claim 2, wherein a selected flip pattern is the predicted flip pattern based on a determination the coded video bitstream includes information that indicates using the predicted flip pattern.

7. The method according to claim 2, wherein a selected flip pattern is the no flip pattern on a determination the coded video bitstream includes information that indicates not to use the predicted flip pattern.

8. A video decoder comprising:

at least one memory configured to store computer program code; and at least one processor configured to access the computer program code and operate as instructed by the computer program code, the computer program code including:

receiving code configured to cause the at least one processor to receive a coded video bitstream including a current picture that includes at least one block includes a template that includes neighboring reconstructed samples on at least two sides of the at least one block, first determining code configured to cause the at least one processor to determine that the at least one block is to be predicted in a reconstruction-reordered intra block copy (RR-IBC) mode, obtaining code configured to cause the at least one processor to obtain a syntax element from the at least one block, the syntax element indicating a flip mode, second determining code configured to cause the at least one processor to determine whether reconstruction flip is applied to the at least one block, predicting code configured to cause the at least one processor to, in response to determining the reconstruction flip is applied to the at least one block, predict a flip pattern for the at least one block based on neighboring reconstruction samples of the at least block and a corresponding reference block of the at least one block, the predicting the flip pattern including calculating a template distortion for each flip pattern, and wherein the predicted flip pattern is the flip pattern having a minimum distortion, the template distortion for the flip pattern including determining a distortion between the template of the at least one block and the template applied to the corresponding reference block in which the template is flipped, and decoding code configured to cause the at least one processor to decode the at least one block based on the flip mode and the predicted flip pattern.

9. The video decoder according to claim 8, wherein the predicted flip pattern is one of a horizontal flip pattern, a vertical flip pattern, and a no flip pattern.

10. The video decoder according to claim 9, wherein the predicting code is further configured to cause the at least one processor to determine the template distortion for the horizontal flip pattern by determining a distortion between the template of the at least one block and the template applied to the corresponding reference block in which the template is horizontally flipped, wherein the predicting code is further configured to cause the at least one processor to determine the template distortion for the vertical flip pattern by determining a distortion between the template of the at least one block and the template applied to the corresponding reference block in which the template is vertically flipped, and wherein the predicting code is further configured to cause the at least one processor to determine the template distortion for the no flip pattern by determining a distortion between the template of the at least one block and the template applied to the corresponding reference block in which the template is not flipped.

11. The video decoder according to claim 8, wherein the predicting code is further configured to cause the at least one processor to predict the flip pattern by calculating a smoothness score for each flip pattern, and wherein the predicted flip pattern is the flip pattern having a highest smoothness score.

12. The video decoder according to claim 11, wherein the smoothness score for the no flip pattern is based on neighboring reconstructed samples of the at least one block and boundary samples of the at least one block, wherein the smoothness score for the horizontal flip pattern is based on neighboring reconstructed samples of the at least one block that is horizontally flipped and boundary samples of the at least one block that is horizontally flipped, and wherein the smoothness score for the vertical flip pattern is based on neighboring reconstructed samples of the at least one block that is vertically flipped and boundary samples of the at least one block that is vertically flipped.

13. The video decoder according to claim 8, wherein a selected flip pattern is the predicted flip pattern based on a determination the coded video bitstream includes information that indicates using the predicted flip pattern.

14. The video decoder according to claim 8, wherein a selected flip pattern is the no flip pattern on a determination the coded video bitstream includes information that indicates not to use the predicted flip pattern.

15. A non-transitory computer readable medium having instructions stored therein, which when executed by a processor in a video decoder cause the processor to execute a method comprising:

receiving a coded video bitstream including a current picture that includes at least one block includes a template that includes neighboring reconstructed samples on at least two sides of the at least one block;

determining that the at least one block is to be predicted in a reconstruction-reordered intra block copy (RR-IBC) mode;

obtaining a syntax element from the at least one block, the syntax element indicating a flip mode; determining whether reconstruction flip is applied to the at least one block;

in response to determining the reconstruction flip is applied to the at least one block, predicting a flip pattern for the at least one block based on neighboring reconstruction samples of the at least block and a corresponding reference block of the at least one block, the predicting the flip pattern including calculating a template distortion for each flip pattern, and wherein the predicted flip pattern is the flip pattern having a minimum distortion, the template distortion for the flip pattern including determining a distortion between the template of the at least one block and the template applied to the corresponding reference block in which the template is flipped; and decoding the at least one block based on the flip mode and the predicted flip pattern.

16. The non-transitory computer readable medium according to claim 15, wherein the predicted flip pattern is one of a horizontal flip pattern, a vertical flip pattern, and a no flip pattern.

17. The non-transitory computer readable medium according to claim 16, wherein determining the template distortion for the horizontal flip pattern includes determining a distortion between the template of the at least one block and the template applied to the corresponding reference block in which the template is horizontally flipped, wherein determining the template distortion for the vertical flip pattern includes determining a distortion between the template of the at least one block and the template applied to the corresponding reference block in which the template is vertically flipped, and wherein determining the template distortion for the no flip pattern includes determining a distortion between the template of the at least one block and the template applied to the corresponding reference block in which the template is not flipped.

* * * * *